(12) United States Patent
Shepard

(10) Patent No.: US 6,598,164 B1
(45) Date of Patent: Jul. 22, 2003

(54) DEVICE AND METHOD FOR REDUCING PIRACY OF DIGITIZED INFORMATION

(75) Inventor: Daniel Robert Shepard, North Hampton, NH (US)

(73) Assignee: Nüp2 Incorporated, North Hampton, NH (US)

(*) Notice: Subject to any disclaimer, the term of this patent is extended or adjusted under 35 U.S.C. 154(b) by 0 days.

(21) Appl. No.: 09/290,721

(22) Filed: Apr. 12, 1999

Related U.S. Application Data

(60) Provisional application No. 60/094,252, filed on Jul. 27, 1998, and provisional application No. 60/081,555, filed on Apr. 13, 1998.

(51) Int. Cl.[7] ................................................. G06F 1/24
(52) U.S. Cl. ....................... 713/189; 713/151; 713/164; 713/165; 713/166
(58) Field of Search ............................... 713/151, 164, 713/165, 166, 189

(56) References Cited

U.S. PATENT DOCUMENTS

| | | | | |
|---|---|---|---|---|
| 5,335,277 A | * | 8/1994 | Harvey et al. | 380/240 |
| 5,406,627 A | * | 4/1995 | Thompson et al. | 380/237 |
| 5,455,861 A | * | 10/1995 | Faucher et al. | 379/442 |

* cited by examiner

Primary Examiner—Thomas R. Peeso
(74) Attorney, Agent, or Firm—Testa, Hurwitz & Thibeault, LLP.

(57) ABSTRACT

As advances continue to be made in the area of high density data storage devices, the storage of such data as music (as is presently stored on audio CD-ROM's), books on tape, videos, movies and the like will become more common. However, when this type of information is stored digitally, the risk of data piracy will increase. What is needed is an integrated copy deterring mechanism for stored digitized information such as audio recordings and the like. The present invention is a digital data storage device which comprises one or more Digital to Analog Converters (DAC's). By incorporating Digital to Analog Converters on the chip or within the chip's packaging (a hybrid device), data being output could be made available in an analog form only (although some portion of the stored information could still be made available in a digital format). A device employing the analog output means disclosed could comprise read only data storage means or writable or one time programmable data storage means. By outputting data in analog format only, successive copies of that data will degrade. This degradation of the quality of the stored data will act as a deterrent to some forms of data piracy.

16 Claims, 4 Drawing Sheets

DEVICE AND METHOD FOR REDUCING PIRACY OF DIGITIZED INFORMATION

CROSS REFERENCE TO RELATED PROVISIONAL APPLICATIONS

The present patent application claims priority to provisional patent application 60/081,555 titled "Analog Output Memory Device" which was filed on Apr. 13, 1998 and to provisional patent application 60/094,252 titled "Analog Output Decryption Device" which was filed on Jul. 27, 1998 which are hereby incorporated by reference.

BACKGROUND OF THE INVENTION

1. Field of Invention

The present invention relates to the security of digitized information, and more particularly to the methods and devices for deterring the unauthorized duplication of digitized information.

2. Description of Prior Art

A fair amount of work has been done to ensure the protection of digitized information, such as computer software (e.g., U.S. Pat. Nos. 4,811,288 and 5,233,563), but these applications assumed that the user would never have a need to access the actual digitized information in normal use. These solutions were directed to prevent the user from obtaining a copy of the actual digital information.

But not as much seems to have been done to ensure the storage security of digitized information such as music and video. Digitized music, as exists on CD ROM, was designed to be accessed by the user's equipment for conversion to analog which can then be amplified and listened to. No solution was incorporated into the specification of CD's format because it was accepted that the digitized information would be available at some point during playback. The availability of CD-ROM drives in personal computers only made the security situation worse. This security oversight is most likely partly due to the limited existence of devices having the high density storage capacity, ease of use, ease of transportability, and the like that was necessary for such unauthorized copying to be convenient. By the time digital audio tape (DAT) and recordable CD (CD-R) had become available, the unsecured CD format was set. Video is still ahead of the piracy wave, but as better video compression software becomes available, convenient copies of digitized video is becoming more of a problem, too. What is needed is a means for storing and distributing digitized information without making the digital image of that information accessible in such a way that unauthorized copies can be made.

BRIEF SUMMARY OF THE INVENTION

As high density storage devices become smaller and cheaper, the piracy of digitized information will increase. CD-ROM, with its inherently vulnerable data storage format, will be a risk to its stored information. As advances continue to be made in the area of high density data storage devices (e.g., lower costs and higher storage densities), more and more information such as music (as is presently stored on audio CD-ROM's), books on tape, videos, movies and the like will be made available digitally. Furthermore, as internet commerce grows, more digitized analog information (e.g., audio and video) will be downloaded from the internet making it most vulnerable to piracy because when this type of data is initially made available in digitally copyable files, the risk of data piracy will be at its greatest. What is needed is a means for storing digitized information digitally without making a usable copy of that digitized information available.

The present invention is a digitized information storage device which comprises one or more Digital to Analog Converters (DAC's). By incorporating Digital to Analog Converters on the chip or within the chip's packaging (a hybrid device), digitized information being output is made available in an analog form only (although some portion of the stored information could still be made available in a digital format). As a result, successive copies of the outputted information will have to be created from an analog source and those successive copies will degrade. This degradation of the quality of the stored information would act as a deterrent to some forms of data piracy. This analog output, digitized information storage device can be digitally Read/Write (RW), digitally Write Only (WOM), or preprogrammed.

In the Read/Write case, an encryption key would be used to store the data into the device in encrypted form; in order to play back the information, the information would be read out and decompressed externally to the storage device (where more powerful and costly processing is available), and then the decompressed information would be written back into the storage device where it would be decrypted by the integral decryption logic from which the plain-text would be converted to analog for outputting without that plain-text being made available off the device. It will be obvious to one skilled in the art that the storage could be accomplished separately from the device (resulting in a decryption device comprising analog outputs), but it is more convenient to store the initial version of the information with the decryption key (which is inaccessible outside the device). In addition, when such decryption is combined with a compression/decompression mechanism, the only plain-text form of the information available is the analog version of the decrypted and decompressed data; one could obtain neither a compressed nor a decompressed copy of the data in non-encrypted form. As a result, if one hoped to pirate the data, he would not only have to redigitize it but he would have to recompress it as well.

The WOM version would essentially be a one time programmable ROM (OTP-ROM) with integral decryption and DAC's; this version of the device would be desirable when the information is simply encrypted and need only be decrypted and converted to analog prior to outputting. This version would be useful for information which cannot be significantly compressed (e.g., because of loss of quality resulting from available compression techniques).

In the last case, uncompressed digitized information is inserted into the device at the time of manufacture either as a OTP-ROM or during semiconductor manufacture. That digitized information need never be made available outside the device, and as a result, the decryption mechanism can be omitted. In this case, the device can be thought of simply as a ROM with integral DAC's.

It should be noted that the techniques described herein for incorporating decrypting means prior to the data being converted from digital form into analog form for output are applicable to a variety of data encryption means ranging from such simple mechanisms as a ROM Lookup Table or an XOR encryption through the U.S. Bureau of Standards DES encryption to a public key encryption such as PGP. Furthermore, as will be shown, the encryption can be synchronized to the compression used, if any. In this way the data can be decompressed prior to decryption (the reverse of what is currently available) such that powerful computing means can be used for decompression which would give the user access to the decompressed digital information, but which, because it is still encrypted, would not give the user a usable digital copy.

While other solutions might place the decryption or other security means in a playback unit, this is inconvenient because it makes it impractical to use that information (playback) on other than that specific playback unit (or units if they are configured identically). The present invention has the advantage that, by placing the means to prevent unauthorized duplication within the packaging which contains the information, instead of placing that means all or in part within the playback unit, it is much more convenient to use the present invention. Also, in the case of factory programmed devices, devices can be made without the need for any information from the end user.

The present invention converts digitized information to a non-digital form prior to making that information available outside the device. Any information which is used in other than a pure digital form could benefit from the present invention.

DETAILED DESCRIPTION OF THE INVENTION

Figure 1:
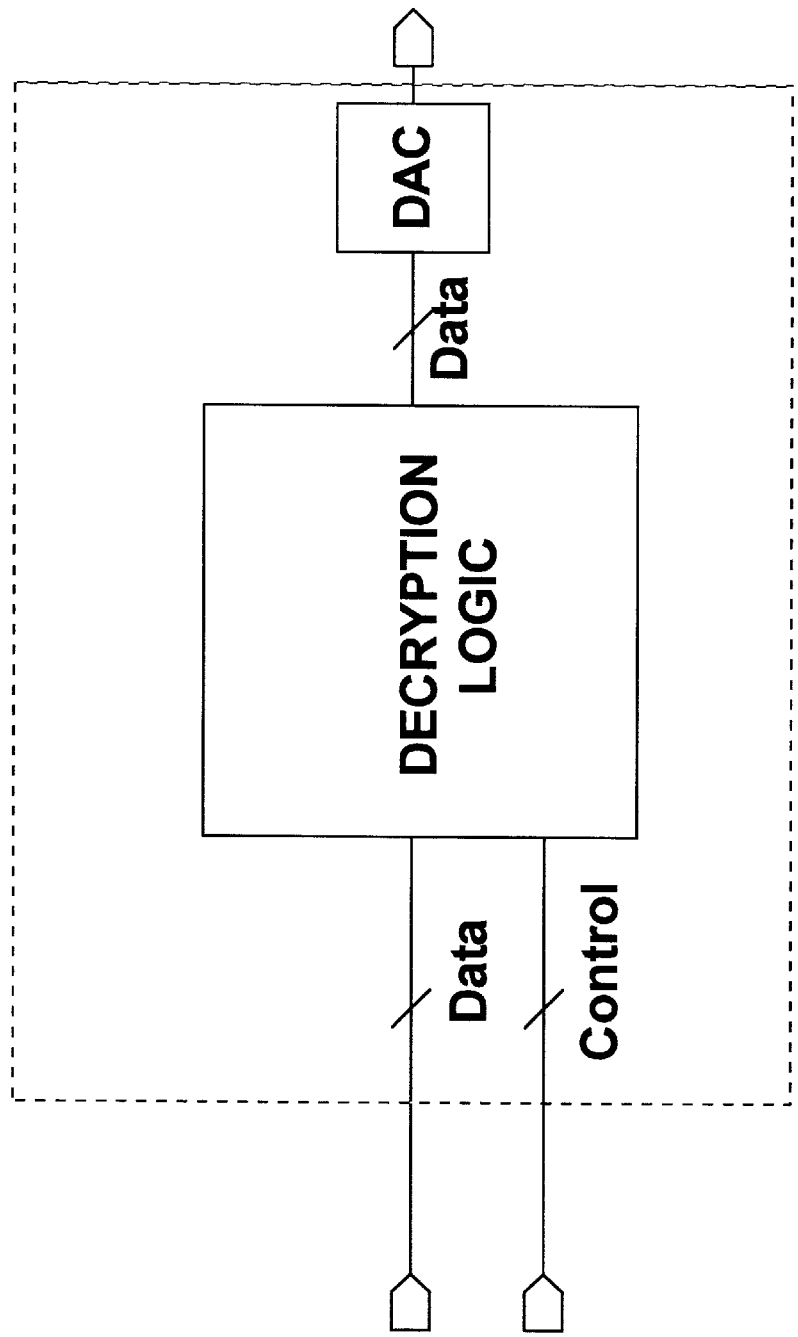
FIG. 1. is a block diagram which illustrates a device for decrypting and converting the data to be output in analog form.
Figure 2:
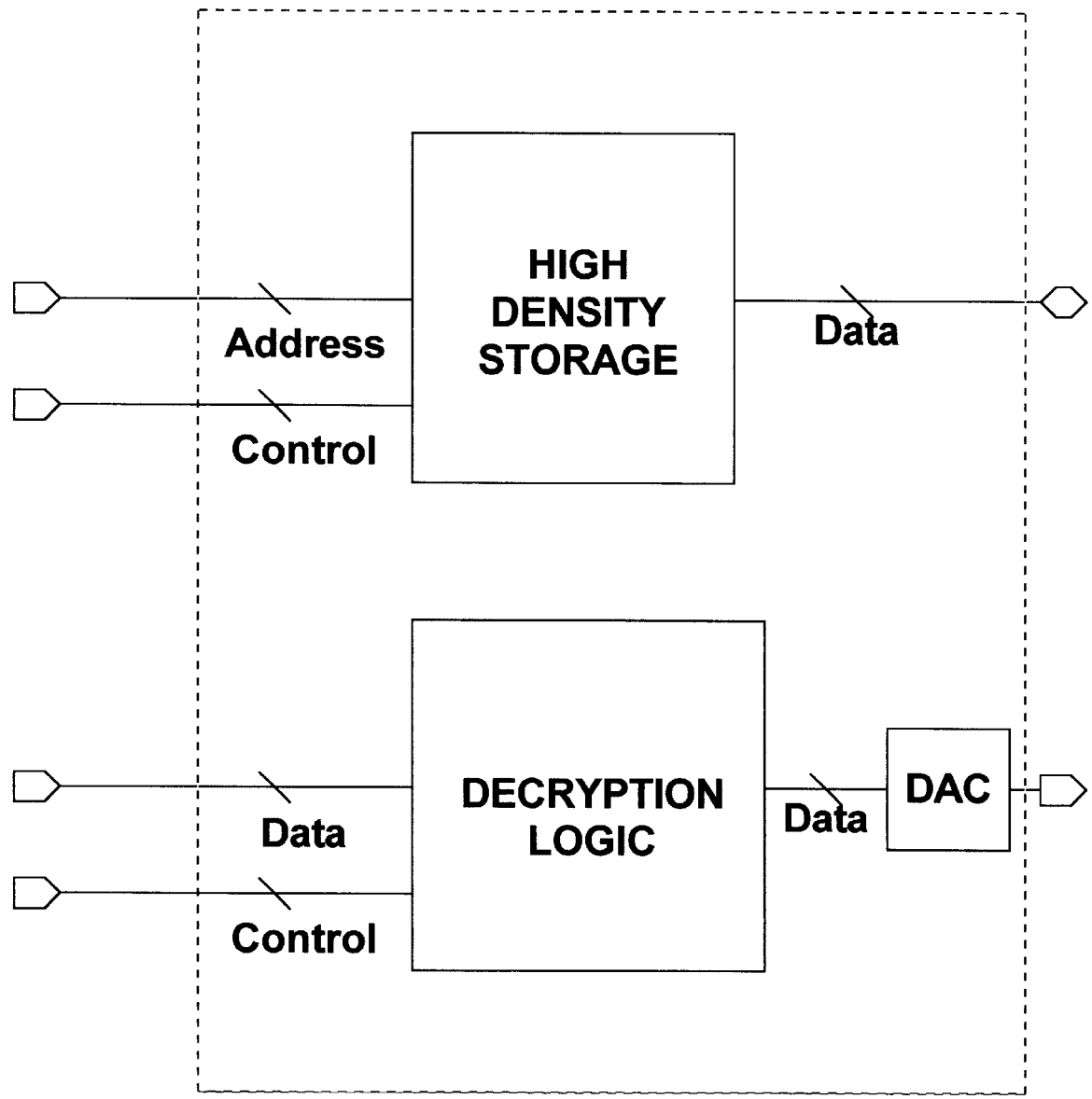
FIG. 2. is a block diagram which illustrates a device for storing, decrypting and converting the data to be output in analog form.

Refer now to the figures which shows a preferred embodiment of the invention. FIG. 1 shows a Decryption circuit block diagram with a Digital to Analog converter integral to it. The decryption device and the DAC could be fabricated on a single chip or it could be packaged within the same package (a hybrid packaged device). FIG. 2 shows a high density storage device within the device (this too could be fabricated on the same chip or packaged within the same package). The high density storage is optional within the device, but recommended.

The decryption means is widely understood by those knowledgeable in the art; some such devices, such as a decryption chip which implements the DES decryption standard is commercially available and manufactured by the Intel corporation and other manufacturers. This device would simply prevent the resulting plain-text from the decryption device to be available outside the device except after passing through a DAC.

In this way, a key that is printed on the package or that is available to be read out from the package in digital format Oust as one can read internal register information) would be provided by the owner of the particular package (every package could have its own key number) to a seller of digitized analog information such that that data could then be encrypted by that seller and then provided to that buyer. Of course, if a person wanted to break the code badly enough to obtain the plain-text form of the digitized analog data, this key would be a clue to that information. Although, if the key was just an index number used to look into a database of encryption keys kept by the seller of the Decryption/DAC devices, the seller of the digitized analog data would give the key from the buyer to that seller of the Decryption/DAC devices who would then give the seller of the digitized analog data the key to use to encrypt that data.

Alternately, if a public key type of encryption was used, then it would be the public key that was read out so that the data could be encrypted by the seller of the digitized analog data but not decrypted by any one or anything except for that Decryption/DAC device. Ideally, but not necessarily, the Decryption/DAC device would also contain high density data storage (such as flash memory) so that the encrypted data and the means to convert that data (but with the result of such decryption available only in analog format) could be kept together. This would enable the owner of that copy to play it on any playback device by plugging Storage/Decryption/DAC device into the playback unit of choice. It should be noted that since the encrypted data can be written into the High Density Storage portion of the device, it should also be available to be read out of the device in digital format to verify that it was written into the device correctly. This is allowable because the data in available only in encrypted form.

Furthermore, if the data was compressed, it could be read out of the High Density Storage portion of the device, decompressed by a more powerful processing unit (one that might be too costly to be included on the same chip or within the same hybrid package), and then the resulting decompressed (but encrypted) data could be written back into the Decryption portion of the device where it would be decrypted and converted into an analog signal which would be available off the device.

Figure 3:
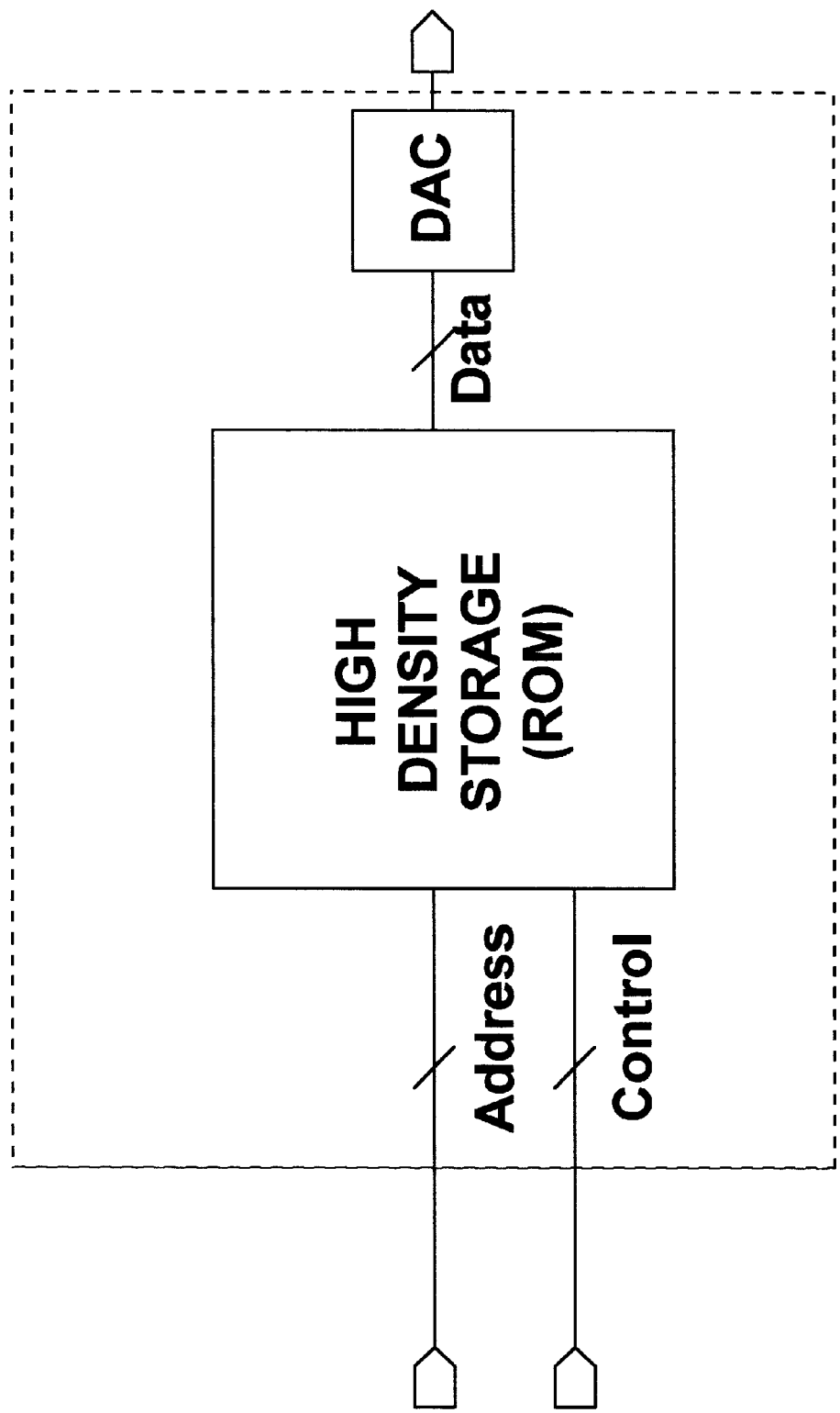
FIG. 3. is a block diagram which illustrates a variation in which the device storage is internal ROM and the decryption means is omitted.

Finally, if the data was programmed into the device during manufacture or as a one-time programming operation by the seller of the information, and if that data could not be read from the device in digital format, then no decryption logic would be necessary and the data output from the storage portion of the device would form the inputs to the digital to analog conversion portion of the device. This is shown in FIG. 3.

The present invention is ideally suited for selling digitized analog data (such as audio or video) over the internet or over other forms of transmission. Current technology starts with a program such as an audio recording that has been converted into digital form by an Analog to Digital Converter (ADC). This digitized information is compressed (e.g., by a compression package such as "Stuff-it" which is widely available on the internet) and then stored on an internet server. A user requesting a download of this compressed data can, by using an internet browser or ftp or other means, transfer a copy of the data to his or her own computer where it is decompressed. At this point the user has a plain-text copy of the data and could sell (pirate) unauthorized copies. With the present invention, a plain-text copy the data would reside on the internet server. When a copy was requested, the key from the Storage/Decryption/DAC device would first be passed up to the server where the data would be encrypted accordingly and then compressed after which the resulting compressed and encrypted copy would be downloaded. By building the decryption key into the decompression hardware, (every hardware device would have a unique key), the user would never have a plain-text copy of the data that he could pirate.

Figure 4:
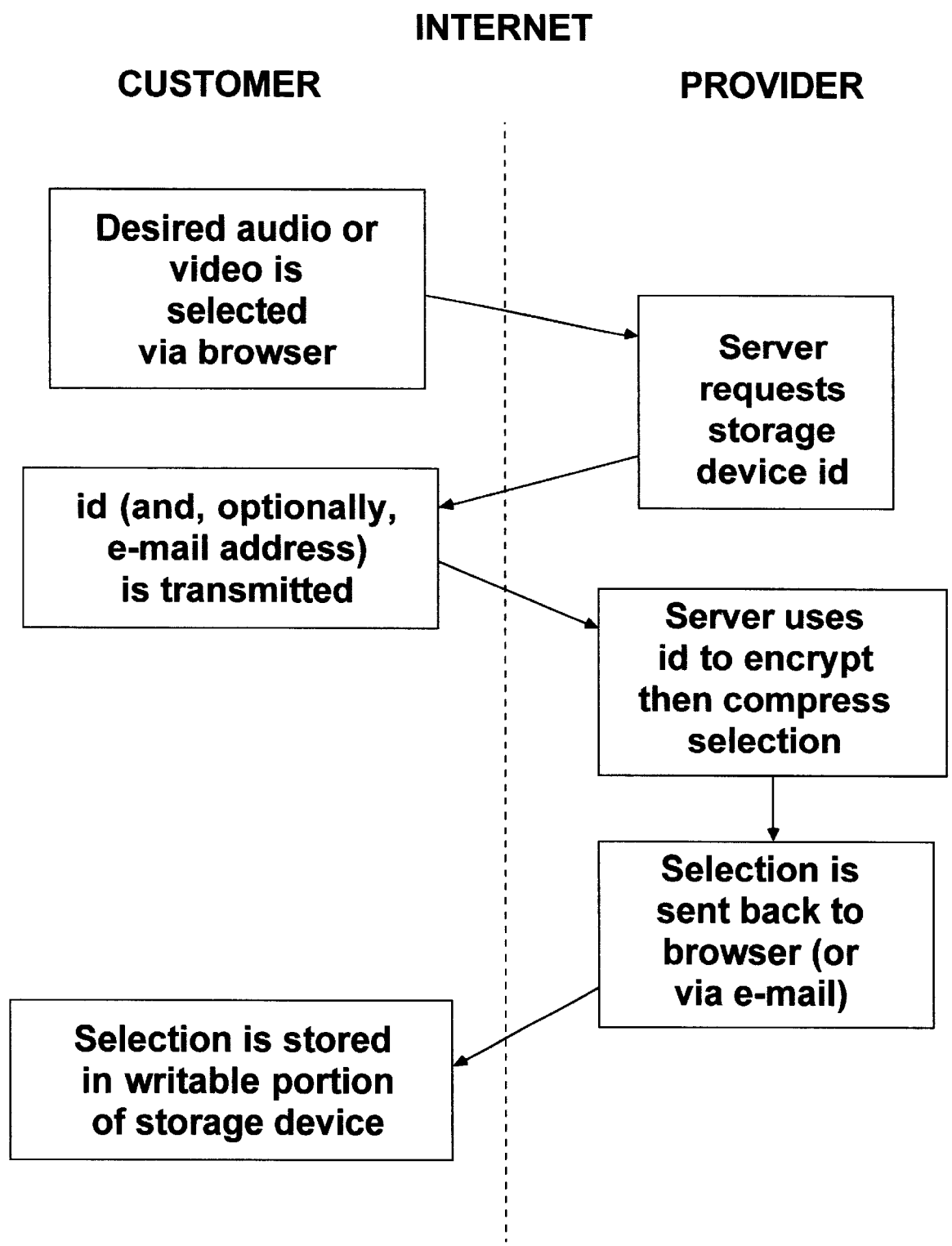
FIG. 4. is a flow diagram of a method for using the device in conjunction with downloading digitized information over the internet or other form of transmission.

FIG. 4 shows a flow chart of how an internet transaction could be accomplished in conjunction with the use of the device. First, the user would browse the web site of an information provider, say the producer of music. The selection of a recording is made. This recording is stored on the information provider's internet server in plain-text. The server software, in addition to handling the purchase transaction, requests the id of the device where the information is to be stored. The user could read a key off the device itself or hardware specially designed for the purpose could be directed to access the device (which the user would have been prompted to place into that hardware) which would read the key from the device. This key would be transmitted to the server which would use that key to encrypt the selected recording. The encrypted recording is now downloaded to the user. The received encrypted recording is now stored into the device after which the device can be removed. Now, the programmed device is available to be used in any of a variety of playback units designed for such a storage device.

It should be clear to one skilled in the art that (1) the sizes of the data storage parts are highly scaleable and could hold much greater quantities of data than is shown in this description, (2) any of a wide variety of encryption/decryption methods could be employed, (3) the circuitry and logic of the device could be achieved in a vast variety of ways that are widely known and understood, (4) any number of Data Storage Means with their corresponding analog or digital outputs can be included, (5) the sizes of the various Data Storage Means do not have to be the same, (6) any number of DAC outputs having any number of bits of resolution could be included, (7) the High Density Storage could be of the read only type and the device sold preprogrammed with data, (8) automatic address generation and sequencing logic could be incorporated in the device thereby reducing the device cost by reducing the number of input connections (e.g., replacing all of the address lines with, say a serial shift input and clock line) and (9) the decryption could be performed upon storing the encrypted information into the device (provided that the data need not later be read back out of the device for decompression) such that at the time of playback, the stored decrypted information is converted to analog without the need for real-time decryption (making more complex encryption possible with slower, less-costly decryption logic).

When the device is used for video data that is compressed using a compression means such as MPEG, not all of the data would necessarily be encrypted. For example, only the color maps might be encrypted so that the patterns in the video data that enable this method of compression to be so efficient would not be lost. Only by playing the decompressed data back through the device would the image appear correct (the encrypted, decompressed data might be viewed and pirated, but the result would likely be worse than just redigitizing the analog version of the decrypted signal). In this case, preprogrammed ROM storage might be utilized where the compressed and encrypted data could be read in digital format in order to perform decompression which would yield encrypted information that would be written back into the device for decryption and conversion to analog. It should be noted that while it will be more costly to incorporate decryption logic in each such storage device, it may well be worth the expense to protect such information as video programming (i.e., movies).

The foregoing description of an example of the preferred embodiment of the invention and the variations thereon have been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by any claims appended hereto.

What is claimed is:

1. A portable storage device for removable use with a playback unit for presenting digital data stored within the device to a user, the storage device comprising:
   at least one integral digital-to-analog converter in communication with the stored digital data for converting the stored digital data into an analog form for use by the playback unit, the storage device preventing external access to at least a portion of the stored digital data.

2. The portable storage device of claim 1, wherein the stored digital data is stored in an encrypted form.

3. The portable storage device of claim 2 further comprising decryption logic, in communication with the at least one digital-to-analog converter, for decrypting the stored digital data prior to conversion thereof to the analog form.

4. The portable storage device of claim 3 further comprising a memory for storing the digital data prior to conversion thereof to the analog form.

5. The portable storage device of claim 4, wherein the decryption logic decrypts the digital data after the digital data is stored in the memory and prior to conversion thereof to the analog form.

6. The portable storage device of claim 4, wherein the decryption logic decrypts the digital data before the digital data is stored in the memory and prior to conversion thereof to the analog form.

7. The portable storage device of claim 3 further comprising a decryption key, unavailable external to the device, for use by the decryption logic to decrypt the stored digital data.

8. A method of preventing unauthorized copying of stored digital data, the method comprising the steps of:
   providing a portable storage device for use with a playback unit for presenting to a user content stored in digital form within the device;
   removably associating the storage device with the playback unit;
   converting the stored digital content to an analog signal by a digital-to-analog converter integral to the device; and
   providing the analog signal to the playback unit for presentation to the user, but preventing access to at least a portion of the stored digital content.

9. The method of claim 8, wherein the stored digital content is received from an information source in encrypted form and further comprising the step of decrypting the encrypted content prior to the converting step.

10. The method of claim 9 further comprising the steps of:
    compressing at least a portion of the content; and
    decompressing at least a portion of the content prior to the converting step.

11. The method of claim 10, wherein the compression step is performed by the information source.

12. The method of claim 10, wherein the decompression step is performed by the device.

13. The method of claim 9 further comprising the step of selecting the content to be stored in digital form from the information source.

14. The method of claim 8 further comprising the steps of:
    compressing at least a portion of the content; and
    decompressing at least a portion of the content prior to the converting step.

15. The method of claim 14, wherein the compression step is performed external to the device.

16. The method of claim 14, wherein the decompression step is performed by the device.

* * * * *